(12) United States Patent
Zawacki et al.

(10) Patent No.: US 8,924,863 B2
(45) Date of Patent: Dec. 30, 2014

(54) COLLABORATIVE WEB NAVIGATION USING DOCUMENT OBJECT MODEL (DOM) BASED DOCUMENT REFERENCES

(75) Inventors: Jennifer G. Zawacki, Hillsborough, NC (US); Justin T. Dubs, Durham, NC (US); James J. Thrasher, Efland, NC (US); David C. Challener, Raleigh, NC (US); Sean M. Ulrich, Morrisville, NC (US); Julie A. Morris, Raleigh, NC (US); Peter G. Gaucher, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1179 days.

(21) Appl. No.: 12/242,448

(22) Filed: Sep. 30, 2008

(65) Prior Publication Data
US 2010/0083135 A1 Apr. 1, 2010

(51) Int. Cl.
G06F 3/00 (2006.01)
G06F 3/048 (2013.01)
G06F 17/30 (2006.01)

(52) U.S. Cl.
CPC ................................ G06F 17/30873 (2013.01)
USPC ............ 715/753; 715/810; 715/764; 715/860

(58) Field of Classification Search
USPC .......................................... 715/764, 810, 753
See application file for complete search history.

(56) References Cited

U.S. PATENT DOCUMENTS

| | | | | |
|---|---|---|---|---|
| 5,337,407 A | * | 8/1994 | Bates et al. .................... | 715/751 |
| 5,339,389 A | * | 8/1994 | Bates et al. .................... | 715/742 |
| 5,944,791 A | * | 8/1999 | Scherpbier .................... | 709/218 |
| 6,008,804 A | * | 12/1999 | Pommier et al. ............... | 715/753 |
| 6,240,444 B1 | * | 5/2001 | Fin et al. ........................ | 709/205 |
| 6,732,145 B1 | * | 5/2004 | Aravamudan et al. ........ | 709/204 |
| 6,748,418 B1 | * | 6/2004 | Yoshida et al. ................ | 709/204 |
| 7,039,677 B2 | * | 5/2006 | Fitzpatrick et al. ............ | 709/204 |
| 7,149,776 B1 | * | 12/2006 | Roy et al. ....................... | 709/205 |
| 7,287,054 B2 | | 10/2007 | Lee et al. | |
| 7,305,439 B2 | * | 12/2007 | Qian et al. ..................... | 709/205 |
| 7,370,269 B1 | * | 5/2008 | Prabhu et al. ................. | 715/230 |
| 7,660,899 B2 | * | 2/2010 | Gavrilescu et al. ........... | 709/227 |
| 8,015,496 B1 | * | 9/2011 | Rogers .......................... | 715/751 |
| 2002/0138624 A1 | * | 9/2002 | Esenther ....................... | 709/227 |
| 2004/0133639 A1 | * | 7/2004 | Shuang et al. ................ | 709/204 |
| 2004/0230560 A1 | * | 11/2004 | Elza et al. ......................... | 707/1 |

(Continued)

OTHER PUBLICATIONS

Nakamura, M.; Ma, J.; Chiba, K.; Shizuka, M.; Miyoshi, Y. Design and implementation of a P2P shared Web browser using JXTA Advanced Information Networking and Applications, 2003. AINA 2003. 17th International Conference on Volume , Issue , Mar. 27-29, 2003 pp. 111-116.

(Continued)

*Primary Examiner* — Amy Ng
*Assistant Examiner* — Erik Stitt
(74) *Attorney, Agent, or Firm* — Ference & Associates LLC

(57) ABSTRACT

A system for collaborative web browsing is provided comprising: a CPU; a system memory in communication with said CPU; a display medium; and instructions stored in the system memory and executable by the CPU, the instructions comprising: enabling a device to join a collaborative web browsing session; enabling a data navigation module to provide, upon an object appearing upon the display medium being selected by a user, outgoing navigation data that enables a rendering of the object to be distinguished from other objects rendered upon at least one other display medium of at least one other device.

15 Claims, 5 Drawing Sheets

(56) References Cited

U.S. PATENT DOCUMENTS

| | | | |
|---|---|---|---|
| 2004/0250201 A1* | 12/2004 | Caspi | 715/512 |
| 2006/0080432 A1* | 4/2006 | Spataro et al. | 709/224 |
| 2007/0208994 A1* | 9/2007 | Reddel et al. | 715/512 |
| 2007/0214423 A1* | 9/2007 | Teplov et al. | 715/751 |
| 2010/0082747 A1* | 4/2010 | Yue et al. | 709/204 |

OTHER PUBLICATIONS

T. Sandy Matthews BrowserFor2 http://www.matthewssoftware.com/BrowserFor2/ 5 pp.

Mozdev.Org Der Tandem Browser, the browser built for two http://dertandembrowser.mozdev.org/ 3 pp.

Advanced Reality Inc Jype 2.0 http://www.tucows.com/preview/405810 2 pp.

Advanced Reality Inc Jype 2.0 http://www.shared-spaces.com/blog/2005/01/review_of_advan.html Published: May 4, 2005 3 pp.

Cambrian House HiveBrower: Real-Time Group Browsing http://www.cambrianhouse.com/ideal/idea-promoter/ideas-id/urGzlfm/ 5 pp.

Cambrian House HiveBrower: Real-Time Group Browsing http://www.cambrianhouse.com/idea/idea-promoter/ideas-id/urGzifm/ 5 pp.

* cited by examiner

400

```
┌─────────────────────────────┐
│  USER 1 SELECTS LINK        │
│  FOR HIGHLIGHTING           │
│                             │
│                        401  │
└─────────────────────────────┘

┌─────────────────────────────┐
│  USER 1 SENDS NAVIGATION    │
│  INFORMATION TO USER 2      │
│                             │
│                        402  │
└─────────────────────────────┘

┌─────────────────────────────┐
│  USER 2 RECEIVES            │
│  NAVIGATION INFORMATION     │
│                             │
│                        403  │
└─────────────────────────────┘

┌─────────────────────────────┐
│  USER 2 HAS SELECTED        │
│  LINK HIGHLIGHTED IN        │
│  USER 2 DISPLAY             │
│                        404  │
└─────────────────────────────┘
```

FIG. 4

COLLABORATIVE WEB NAVIGATION USING DOCUMENT OBJECT MODEL (DOM) BASED DOCUMENT REFERENCES

FIELD OF THE INVENTION

This invention relates generally to computing systems and in particular to providing systems, methods and arrangements for enabling users of different computing devices to establish and share a web-browsing experience with one another by exchanging navigation data.

BACKGROUND OF THE INVENTION

There is an increasing desire on the part of two or more parties to share an Internet or web-browsing session. One common example is a shared online shopping experience. For instance, one person looking at a new product online may wish to ask another (remotely located) person "do you like this"? The first person would normally then follow up (or couple to) the question by a sending a link (i.e. a Uniform Resource Locator (URL)) to the web page containing the picture of the product currently being viewed to the other person. That is, send the second person a link to the currently viewed web page such that upon clicking the link, a web browser would open the page for viewing by the second person. If additional people were involved (e.g. the first person wanted to have the opinions of others as well), a similar process for sharing the link and the related information would be followed, e.g. via pasting a link into instant messenger (IM).

Another example of a shared web-browsing or online experience would be online lecture notes of a course displayed on a web page. The viewers of the syllabus could navigate through the notes. Traditional arrangements do not provide the different viewers efficient delivery of information about what the other viewers of the syllabus have or are currently looking at while maintaining the ability for the users to independently browse the online document(s). A solution mentioned above is to send a separate communication (e.g. instant text message) describing what has been or is being viewed or to share URLs such that each person is viewing the same page in the session.

Another conventional solution is to utilize a product that provides all monitors with the same view (e.g. WEBEX) such that one person (i.e. a leader) can drive the other viewers' (i.e. followers) monitors. A major shortcoming of this solution is that there is a great amount of data that is necessarily transferred between users (i.e. sent over an Internet connection). Conventional solutions such as WEBEX solve the view-sharing problem by sharing everything or a subset of everything (e.g. when a leader moves his or her mouse on the machine it moves the mouse in the other person's (follower's) view; or, when one person closes a window in the browser it closes the same window in the other person's view). That is, all information is shared and it is all essentially a rendering of the first person's (leader's) desktop view. However, a large amount of information is necessarily exchanged and the leader expects from the other person some input (e.g. mouse clicks) such that the leader can control the remote view. Moreover there is a lack of independence when participating in such an online session.

Thus, given a collaborative web-browsing session, the kind of browsing one can do has been essentially limited to simple URL requests. Some requests, such as events initiated by JAVA script or parts of an embedded component, such as a FLASH object, are unavailable. This means, for instance, that if users were sharing a video, the users could not pause the movie on all instances in the session. Due to the proliferation of this type of media embedded in the web experience, this limits the users' experience in a shared session.

These arrangements for sharing an Internet or web-browsing experience do not result in a truly collaborative/shared browsing experience where each party involved can fully participate by being efficiently informed of the others' navigation behavior while being free to do their own browsing online. Therefore, there is a need for a new solution that addresses the shortcomings of the conventional arrangements summarized above.

SUMMARY OF THE INVENTION

In summary, one aspect of the invention provides a system comprising: a CPU; a system memory in communication with the CPU; a display medium; and instructions stored in the system memory and executable by the CPU, the instructions comprising: enabling a device to join a collaborative web browsing session; enabling a data navigation module to provide, upon an object appearing upon the display medium being selected by a user, outgoing navigation data that enables a rendering of the object to be distinguished from other objects rendered upon at least one other display medium of at least one other device.

Another aspect of the present invention provides a method comprising: enabling a device to join a collaborative web browsing session; upon selection of an object rendered upon a display medium of the device, providing outgoing navigation data that enables a rendering of the object to be distinguished from other objects rendered upon at least one other display medium of at least one other device.

Another aspect of the present invention provides a program storage device readable by machine, tangibly embodying a program of instructions executable by the machine to perform a method comprising: enabling a device to join a collaborative web browsing session; upon selection of an object rendered upon a display medium of the device, providing outgoing navigation data that enables a rendering of the object to be distinguished from other objects rendered upon at least one other display medium of at least one other device.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 4 is a flow chart depicting the sharing of navigation information.

DESCRIPTION OF THE PREFERRED EMBODIMENTS

Figure 1:
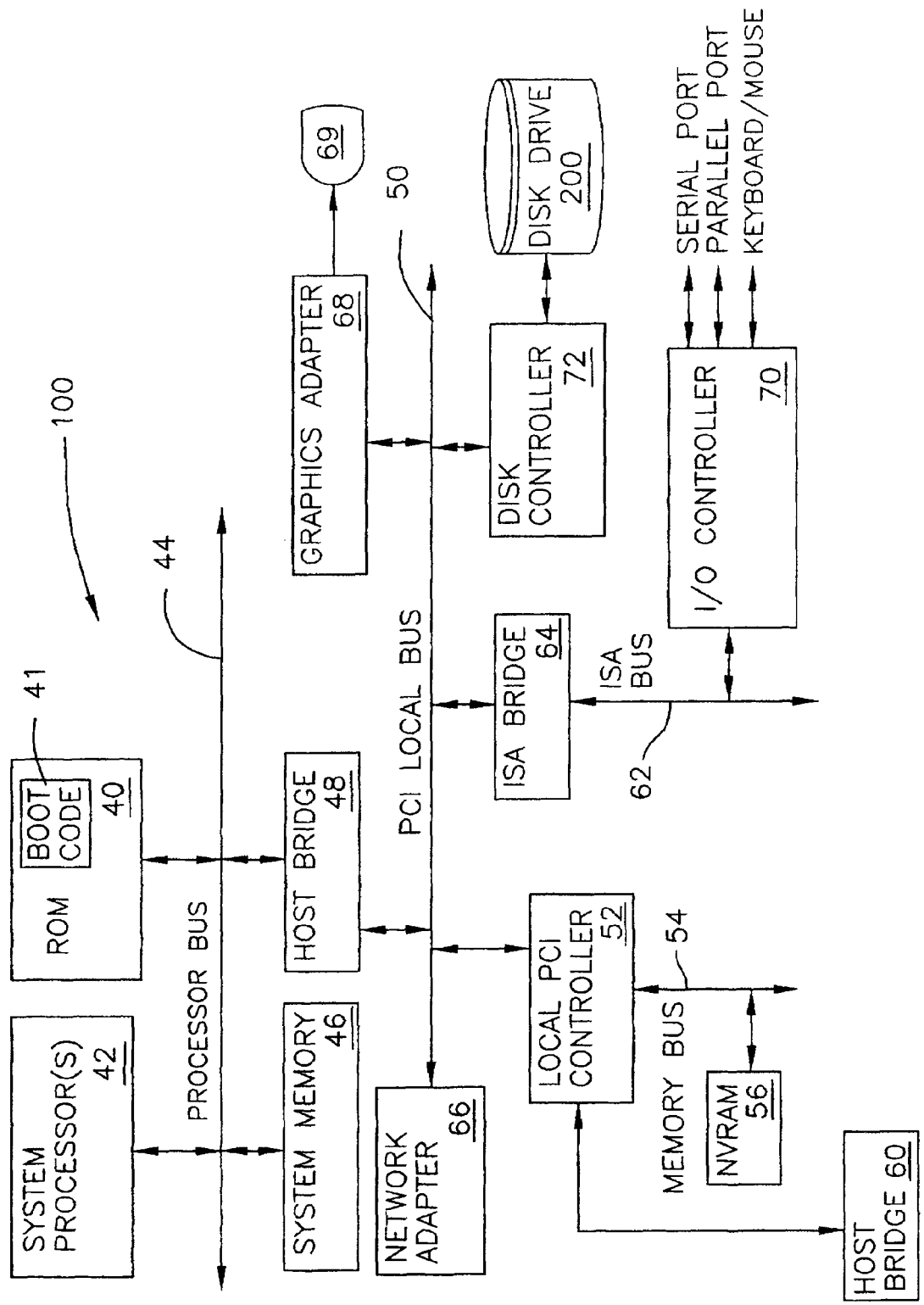
FIG. 1 is a block diagram of a computing device.

While the present invention will be described more fully hereinafter with reference to the accompanying drawings, in which a preferred embodiment of the present invention is shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but does not necessarily, all refer to the same embodiment.

This detailed description will first start with a general overview of the instant invention and then provide a more detailed discussion of specific preferred embodiments of the invention with reference to the accompanying drawings. The scope of the invention will be pointed out in the appended claims.

Some helpful background information on enhanced URL sharing may be found in co-pending and commonly assigned U.S. patent application Ser. No. 12/050,813 "Apparatus, System, and Method for Uniform Resource Locator Sharing", filed on Mar. 18, 2008, which is herein incorporated by reference as if fully set forth herein. According to this system, URLs may be shared in order to keep all viewers in a session viewing the same web page. Thus, it allows users to enhance the shared browsing experience by enabling each involved in the session to view the web page.

In a shared URL environment, there are times when it is useful to indicate a link on the web page to other users who are sharing the browsing experience. With the strict URL passing (described above), there is no way to indicate that a particular section of the web page, such as the download link for a file, should be clicked. For full screen sharing, there is a large amount of bandwidth required for the simple process of indicating a link.

According to one embodiment of the instant invention, a method is provided to allow one or multiple users to select links on a web page and have those links indicated via a colored highlight, flash, font change, or other indication method to the users of the shared browsing experience. A preferred implementation is to have a co-browsing specific web browser that passes the information as to what the "leader" has clicked on to the rest of the users. The viewing systems receive the information and flash the appropriate location on the viewing displays (web browser displays) of the other users.

Alternate implementations include at least assigning each member of a co browsing session a unique color or icon. That color or icon is displayed to all the other users around the selected link that the assignee chooses; thus multiple users can be emphasizing the same link at the same time without confusion.

In the case where there is a leader and the rest of the session members are followers, any link that the leader clicks that does not refresh the browser window (i.e. does not cause the followers' sessions to navigate to a new page) becomes a flash on the followers' browser windows at the appropriate location. The leader can optionally choose to right click a link (e.g. with a mouse or touch pad) and select the "suggested link" option to cause a flash to any URL, whether it would reload the page or not. The leader can also choose to enable the followers to default to the "suggest link" behavior, enabling all viewers to click on any link and have that link highlighted to the session users/group. In this case, the link is not followed unless the leader then selects the link.

At least one implementation according to another embodiment of the present invention is to engage in a "suggest but not follow" scenario. Thus, a user is allowed, in a browsing scenario, to indicate a link to the others but not to follow that link if that link is clicked by one of the other users (as suggested). That is, the browsing session is essentially paused for the user that did the suggesting of the link.

Accordingly, a system for enabling a shared/collaborative web-browsing session is provided to enable users of different peer computers/devices to share a web-browsing session in a flexible and efficient manner. The present invention provides a user with an opportunity to utilize a web-browsing session to discern what others participating in the session are viewing (i.e. what the other users are navigating to in their web browsers) as well as provide the others in the session with information about his or her own navigation while online, all the while maintaining independent control over his or her browsing experience.

The invention enables users to open a session specific web browser, a chat window, a list of bookmarks, etc., all in one convenient view (e.g. containing multiple tabs), so as to provide a plurality of users engaged in a shared online browsing session with one another's navigation data/information. The users participating in the session may pass navigation information/data back and forth between themselves to indicate to one another which links/objects each is viewing.

The present invention enables a first person having a web-browsing session open to navigate on his or her computer (e.g. at home) and a second person having the session open to have an independent view that is updated contingent upon the first person's activities. Likewise, the second person can navigate independently on his or her machine (e.g. at work) and the first person's independent view will be updated. The two users' views will update upon the other's received navigation information. Essentially, the session amounts to having two monitors looking at the same web page, the difference between the views is that instead of sharing entire screens or views of web pages, the two machines/monitors actually share navigation information/data, while permitting the two users to independently navigate as they wish. That is, the views are updated to provide a rendering of what the other(s) in the session have browsed, without forcing the member of the session to follow a particular leader.

For example, according to the present invention, if a first person clicks on a particular link, the fact that the person clicked on the link is sent to the other person(s) sharing the session via exchange of navigation information. This is contrary to conventional arrangements in which the other person's view is a whole rendering of a page driven from the first person's (i.e. a leader) activities. This is also clearly different from the traditional solution of sending messages (e.g. via IM) through side channels to relate information coupled to links (e.g. a link pasted into an IM window). Therefore, the session is a far more efficient and versatile/flexible system for sharing a web-browsing experience. This is because the information/data traveling over the connection (e.g. peer-to-peer, either wired or wireless) is the traditional chat messages and navigation data/information. This reduces the amount of data that needs to be exchanged compared to conventional solutions.

The users' machines will utilize a common language (e.g. XPATH) to address the sent and received elements of web pages via a tree-like notation scheme as part of the navigation information. On the sender's side, the user machine/device sending the navigation information (e.g. a highlighted link)

will generate an XPATH statement (using e.g. IBM WEB SPHERE PORTAL SERVER) for addressing an element to be highlighted on the recipient's side. On the recipient's side, the machine utilizes a JAVA script engine or the like (that comes with available browsers such as FIREFOX or INTERNET EXPLORER) to call up the particular element (using an XPATH addressing to locate the corresponding element) and then highlight it (e.g. enable it to flash). This provides a simple solution enabling a fuller shared browsing experience without the unnecessary transfer of excess data between the users, which can lead to complications (e.g. due to different Internet connection speeds).

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Purchase, N.Y. or a workstation computer, such as the Intellistation®, which are sold by International Business Machines (IBM) Corporation of Armonk, N.Y.; however, as will become apparent from the following description, the present invention is applicable to operation by any data processing system.

As shown in FIG. 1, computer system 12 includes at least one system processor 42, which is coupled to a Read-Only Memory (ROM) 40 and a system memory 46 by a processor bus 44. System processor 42, which may comprise one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to LAN 10, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and a disk drive. In addition, I/O controller 70 supports external communication by computer system 12 via serial and parallel ports.

Figure 2:
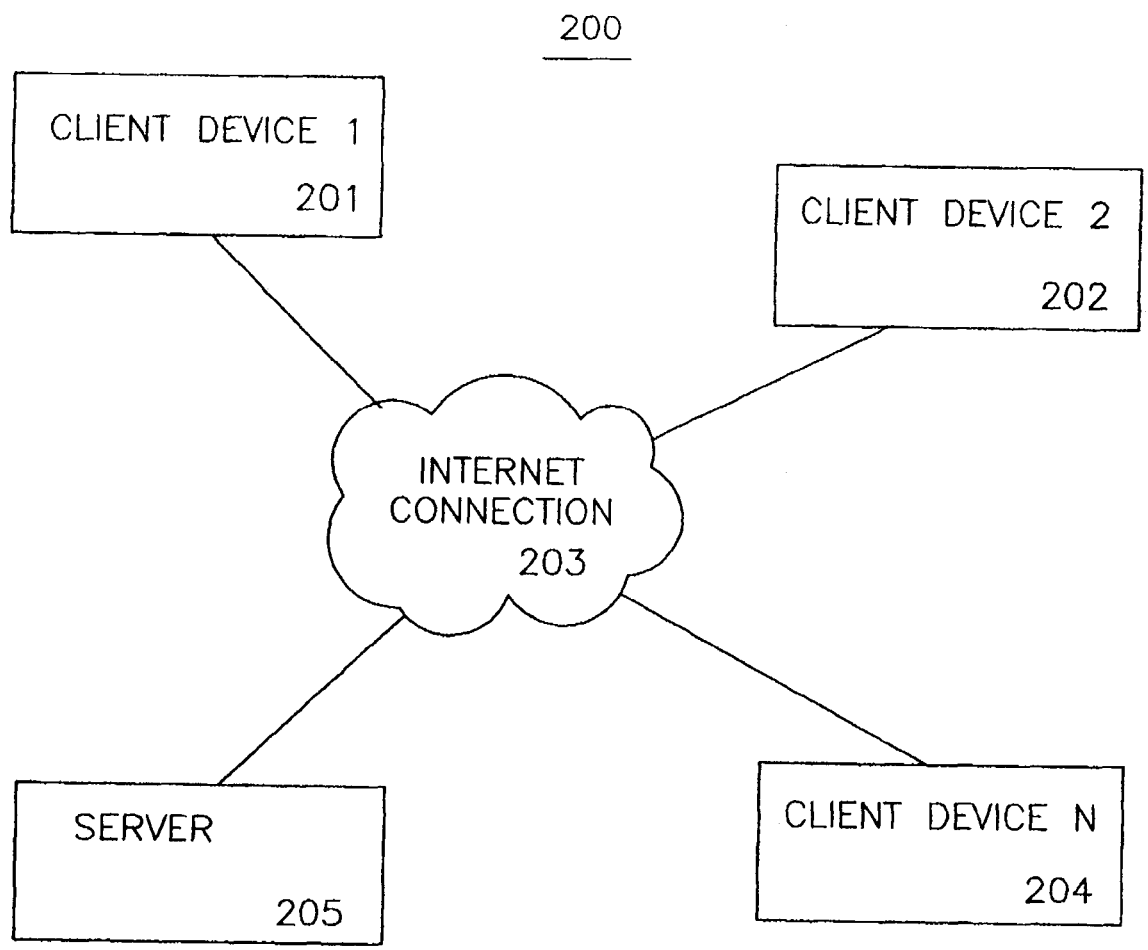
FIG. 2 is a block diagram of a shared browsing session.

FIG. 2 shows a shared browsing arrangement (200) in accordance with an embodiment of the present invention. The arrangement (200) includes a plurality of client devices (e.g. computers) (201, 202, 204) connected a network (e.g. Internet 203) via a plurality of routers (not shown), and a server (205). The network may include a plurality of interconnected computer networks linked through wires/wireless connections. For example, the network may be selected from the Internet, an intranet, a wide area network (WAN), a local area network (LAN), an integrated services digital network (ISDN), or the like. The plurality of computers is in communication with the network.

Each computer (201, 202, 204) and the server (205) may include one or more processor modules and the like referred to herein as modules or components. The server (205) may also include a plurality of databases and a plurality of applications that constitute online web pages (e.g. online store). The server (205) is in communication with the plurality of computers (201, 202, 204) through the network. Each computer (201, 202, 204) may further include a display medium.

Additionally, each computer (201, 202, 204) may include software that includes a web browser. The web browser may be for example MICROSOFT INTERNET EXPLORER®, Mozilla Firefox, Apple Safari, NETSCAPE NAVIGATOR®, or the like. The web browser may automatically convert a plurality of HyperText Markup Language (HTML) codes in the form of corresponding text matter, one or more pictures/drawings, tables, hyperlinks, or the like and a display the created web page in an intended format on the screen of the one or more computers (201, 202, 204).

Figure 3:
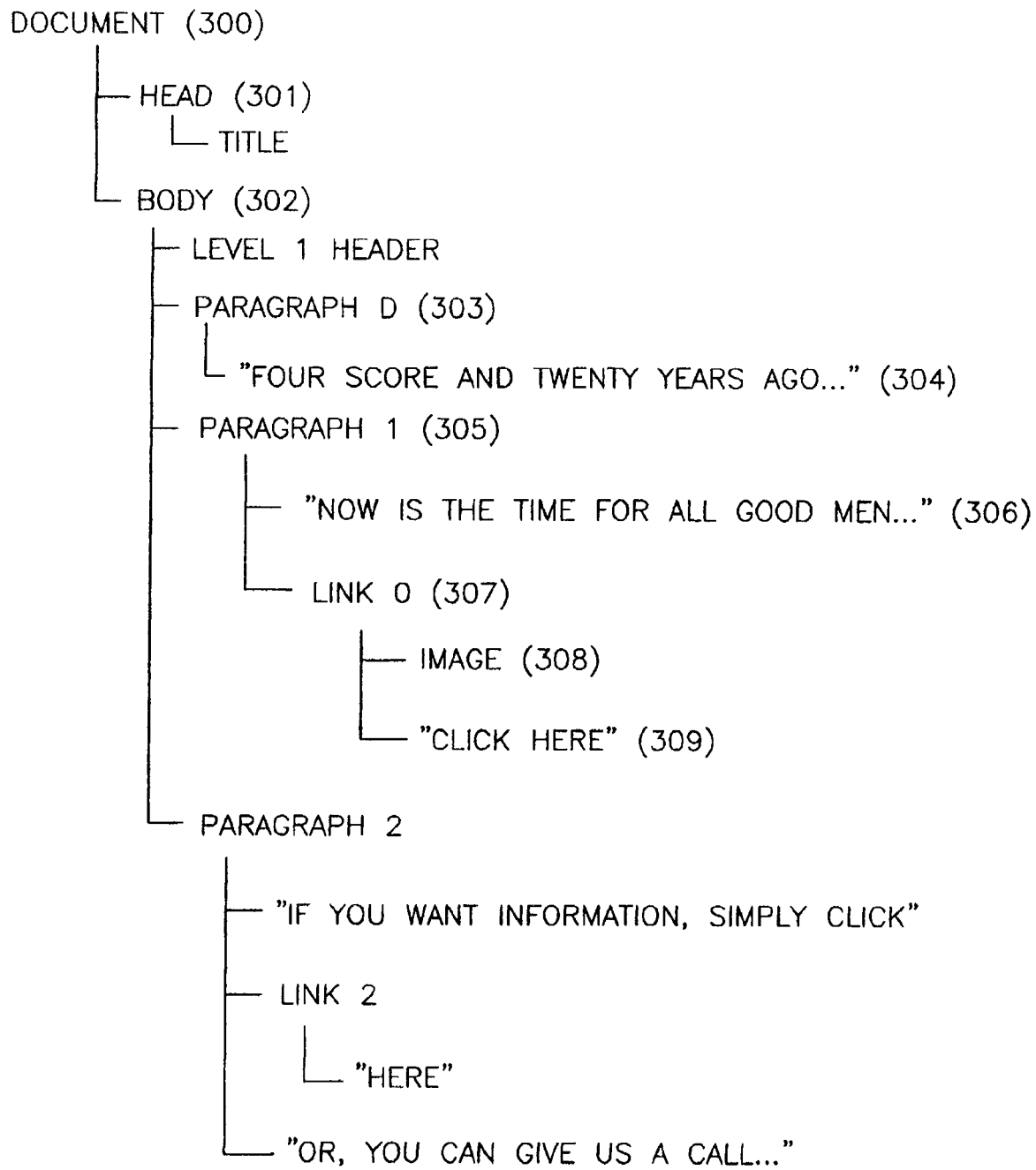
FIG. 3 is a representation of the tree structure of an html document.

FIG. 3 depicts the tree-like structure of a document upon which a DOM (document object model) addressing system is based and that the present invention utilizes to enable one user to highlight an object such as a link (305) on another user's browser display. By sending navigation information from the first user's device (201) to the other user(s) devices (202, 204), an element within the HTML document may be identified by appropriate addressing. This type of addressing avoids many of the problems encountered when two or more users are utilizing different displays (e.g. different resolutions).

An HTML document (300) is essentially arranged in a tree structure and can be described/addressed as such. Individual elements can be referenced using a tree-path notation (such as XPATH). For Example, "/HTML/BODY/P[0]/A" would match all ANCHOR elements (304) in the $0^{th}$ paragraph (303). The whole document (300) is the root of the tree and it contains two nodes, one is the head (301) which contains the title, author, search queues, etc. The body of the document (302) is the other node, containing other elements of the document such as paragraphs (303, 304) and links (305, 306, 307). The notation can be more or less specific as necessary and can include multiple elements. The notation is used to refer to an individual element along with an event of some kind, such as a "click". The event information is passed to other users in the session to allow them to reliably refer to the correct elements on their own devices.

Thus, as a result of this tree structure, every object/element of a document (i.e. nodes in the tree) is addressable. For example, a user wishing to highlight a particular link (305) for others may indicate in his or her web browser the link to be highlighted by right clicking the link and choosing a highlighting option from a menu. This process could also be automated or semi-automated (e.g. automatically generating the navigation information upon a link being clicked). Upon choosing a highlighting option for the link (305), the local browser on the client device (201) would find that element in the HTML document (300) (i.e. web page document) and generate a corresponding XPATH addressing statement. That link's address can then be sent to the other user(s) in the session in the form of navigation data (the navigation data can contain other information, as described below). Once received by the other user(s), their machines (202, 204) would look up the addressing in the displayed document on their browsers to find that particular addressed element and then highlight it (e.g. flash it). This serves to notify the recipient user device that another session user device has navigated to that particular link on the web page.

Referring now to FIG. 4, a plurality of users may conduct an online browsing session (400) and pass navigation data. If the first user wishes to share navigation information regarding an object/element of a web page (e.g. a link), the user may click on the link (displayed on a web page on his or her device's display screen) and select it for highlighting (401).

This navigation data is sent to the other user(s) via the Internet connection (402). The other user receives the information (403) and is informed that the first user clicked on the particular link in their view and selected it for highlighting. The other user, once having received this navigation data at their device, has his or her display updated accordingly (404) (e.g. by highlighting the link or having it flash on the receiving user's screen). The recipient's device will translate the addressing statement to locate the link on the user's display and highlight it. The recipient would then know what the first user had clicked on. This allows the sending user, via sending navigation data, to suggest links to the receiving user without forcing the receiving user to view a particular web page.

Figure 5:
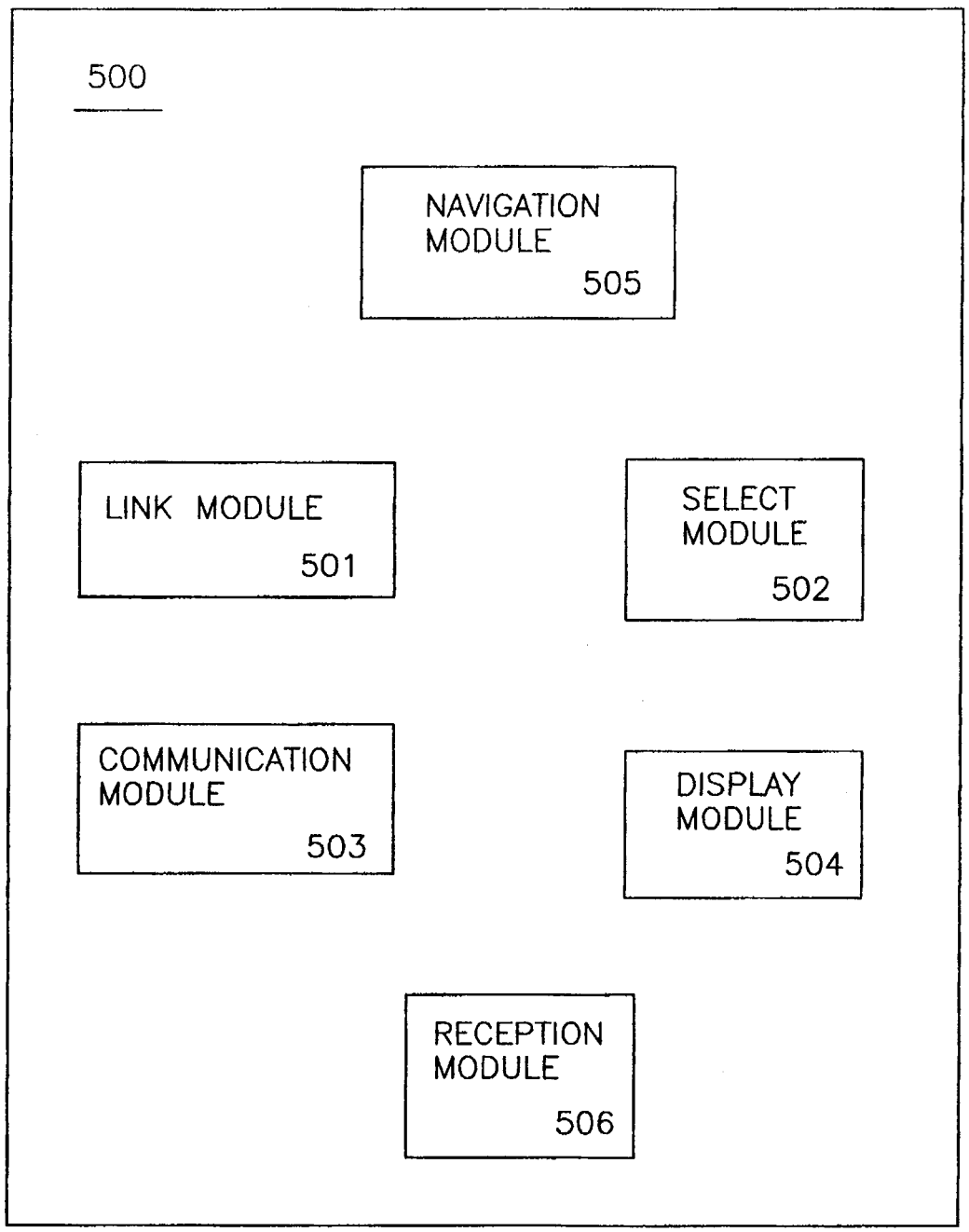
FIG. 5 is a block diagram of an Apparatus according to the Collaborative Web Browsing System.

FIG. 5 shows an apparatus (500) to be utilized with the collaborative web browsing system. The apparatus enables collaborative web browsing with the exchange of navigation data as herein described. The apparatus (500) contains a link module (501), a select module (502), a communication module (503) and a display module (504). The apparatus may be embodied in a computer as shown and described in FIG. 1 and may also include peripheral devices and user interfaces.

The link module (501) links a plurality of users for a collaborative browsing session. A user participating in the session is enabled to select an object (e.g. a link) displayed by the display module (504) on his or her web browser for highlighting using the select module (502). Upon selection, the object is addressed with the proper DOM address utilizing the navigation module (505). The communication module (504) allows the user to communicate the navigation data associated with the selected object (and other information) to the other users participating in the web browsing session. A reception module (506) allows the apparatus to receive other devices' navigation information and display it using the display module (504).

As a non-limiting example, users may utilize the instant invention to conduct online shopping sessions. Thus, the users could choose to join in a shared or collaborative browsing session (e.g. by sending and receiving join and accept requests for the joining up into a collaborative web browsing session). One of the users could indicate an interest in a particular item (e.g. a dress), located by a particular link, through highlighting that link and indicating this to the other users by sending navigation information. The other user(s) could likewise respond (e.g. via chat message in a session chat window) by suggesting "that other dress". Upon clicking on a link for "that other dress" and choosing to highlight it, the first shopper would receive navigation data/information (which would be translated by the recipient's device into a flashing link) from the other(s) that clicked on "that other dress". The users may then proceed to exchange navigation information back and forth, along with more conventional information (e.g. chat messages), rather than forcing one another to go to web pages automatically or merely sharing links pasted into chat messages. Therefore, at least one purpose of highlighting the link (e.g. via flashing) is to draw the shopper's attention to the links that the others sharing the session are viewing, rather than interfering with or controlling the other shopper's browsing experience.

The present invention provides the users participating in a shared browser session with an indication of what the other user(s) has/have clicked on via sharing navigation data in a way discernable to the receiving user(s) machine(s). Providing a way to share accurate navigation data is a problem that a user may encounter with a shared browsing session where the users are sharing essentially URLs clicked but not other data. Since the users are simply sharing URLs between themselves, the users cannot see one another's screens (e.g. mouse movements, etc.). That is, each user is ultimately in control of his or her browsing experience. This may create a problem, for example, when users are sharing URLs but they do not know what screen size(s) or resolutions the other users are utilizing. Without knowing this information, a user cannot easily indicate to one another where upon the screen the particular link is located (i.e. one user cannot tell another that the link is located, e.g. 15 pixels across and 30 pixels down).

According to one embodiment of the instant invention, semantic navigation data is sent over the wire or wireless Internet connection between users such that the client/peer machines can customize how their display renders a view. This results in a much better experience for the user of the client/peer machines (i.e. provides a better/more appropriate view of the data as per the particular display the users have). This is because the renderings upon peer/client devices and the data that is transferred are separate from one another in that they depend on separate sources. The local display device, via the DOM addressing, determines the view presented to the receiving user. In other words, the local client/peer machine renders the received navigation data in a way that fits most appropriately with the particular machine display being utilized.

As a non-limiting example, the web content comes to the user device directly from the server. The web browser then renders the browsed data appropriate to the screen it is viewed upon. This background is presented in the HTML document. Different browsers may thus choose to format a list appearing in a web document in different ways for optimal presentation on the user's display. A typical PC browser would show:

Here are options:
  1. Option 1
  2. Option 2
  1) Option 3

According to one embodiment of the instant invention, the users' browsers each see the same HTML content, however it may be rendered appropriately for their particular displays (and contain the navigation data sent). Thus a user can highlight a particular object in the HTML and ask that additional navigation data be sent to other users about how to render the object (e.g. highlighting). The user selects the object to be highlighted, e.g. item 2 above, and the HTML would then insert a render-neutral indication, such as:

```
<p>Here are options:</p>
<ol>
<li> Option 1</li>
<li><indication>Option 2</indication></li>
<li>Option 3</li>
</ol>
``` where "indication" is an appropriate HTML supported tag. On a first user's system, this may render as:
Here are Options:
1. Option 1
2. Option 2
3. Option 3
and a second user's system may render this as:
Here are Options:
1. Option 1
2. Option 2
3. Option 3
Thus, because both browsers see the same HTML, both browsers can parse the data and thus can both identify objects in a way independent of how they are rendered. The HTML came to both user 1 and user 2 from a standard server, but the way it is rendered is controlled (partially) by information that the users can share among themselves.

This is contrary to conventional solutions (e.g. WEBEX) in that it is expected that every user has a particular resolution display. Thus, the local client/peer machine is not able to understand the semantics put on the screen and resize it if necessary. For instance, if a user wants their own version of a particular document and also wants to view another's display, it requires resizing the views to accommodate both. This can lead to a scenario where the user, after resizing, has a different sized display rendering than the other user (the leader) and must scroll around inside that view to find what the other user may be pointing at. Thus, according to the present invention, changing the rendering at the local client/peer machine will result in a rendering that is most appropriate to that client/peer machine and amounts to allowing the local machine to permit resizing.

The present invention provides navigation data/information is sent that comprises not only the location of an object within a web page that is to be highlighted but also the location within an object within a particular web page. A preferred method for accomplishing this augmented addressing is first utilizing the XPATH addressing to a particular object (e.g. FLASH object) in the web page and then augmenting the addressing with X and Y coordinates. A user may thus highlight (e.g. draw a circle over) that area on the FLASH object (e.g. using JAVA scripts).

As noted above, the instant invention addresses the potential for screen size difference between users by using DOM based the XPATH addressing and also allows specific addressing within particular objects because the addressing is essentially tiered, allowing for address augmentation (e.g. with X, Y coordinates). For example, when a first user sends navigation data, it will first be interpreted to the address or specific location of a particular object within a page (e.g. the top left). Next, utilization of actual X, Y coordinates relative to (e.g. the top left of) that object enables specific addressing within a particular element or object of a web page.

Thus, the receiving user(s) is/are able to discern at a highlight of a particular section of the screen(s), automatically indicating the object that the first user has clicked upon using the above notation. It should be noted that XPATH (or similar language) does not include this capability but may be extended to support such a capability. The X, Y coordinates would be relative to the object itself, thus making them independent of screen and/or window size, etc. This is possible because of the FLASH objects' uniformity in size. For example, if a user clicks the point at 10, 10 inside a FLASH object (e.g. corresponding to a "pause" button on a movie player), the following XPATH could be generated and delivered to other (receiving) users in the session:

//OBJECT[@id="movie023"]/POINT{10, 10}

This indicates the point at coordinate 10, 10 within the embedded OBJECT with the id "movie023". The use of such a notation to share navigation information/events and the extension to individual coordinates within an embedded object is a significant improvement that enables an enhanced shared browsing experience by indicating a particular location within the FLASH object clicked upon.

The navigation data may also include identification information regarding which user(s) is/are navigating to a particular link on the web page. Thus, if one user clicks on a link and the other user(s) is/are notified with a highlighted link (e.g. the link begins to flash), the user(s) would also receive information about the person who sent that data regarding the element (e.g. clicked on that link). There are many ways of indicating an identity of a user via the exchange of navigation data. For example, a particular color could be associated with a particular person such that the element is colored when it starts flashing. Thus, a user receiving navigation data could quickly and easily differentiate between a multiplicity of users clicking on different links by referring to the color(s) associated with the clicked links.

As above, the user may choose to send navigation data corresponding to the links they have clicked in a myriad of ways. At least one way to accomplish this is to highlight a particular element, for example right click on it and then select from a menu a command (e.g. a send-link option). The sending user's machine utilizes a local processor (central processing unit, CPU) to tag the element selected for highlighting with the appropriate addressing and send the data through the Internet connection. Conversely, on the recipient side, once the element identification/navigation information is received, the recipient machine's local processing is utilized to decipher what the addressing sent corresponds to on that particular machine's display (i.e. the recipient machine utilizes the sent navigation information with the addressing information for the highlighted element to implement the highlighting of that element on the recipient machine).

It should be noted that in most cases the present invention does not have a particular leader or a particular follower within a shared browsing session. The instant invention is directed to a peer-to-peer design wherein all participants have the opportunity to lead (i.e. send navigation information relating to their particular navigation activities to other participants within the shared browsing session without forcing a particular view). In other words, a first user can highlight a button on another's machine and the another user can highlight a button on the first user's machine, etc. The present invention supports multiple tabs wherein a particular user is mostly leading in a particular tab, whereas another user is mostly leading in another tab. Of course it is possible to put the instant invention into a leader-follower mode (e.g. a teacher that does not want to enable students to highlight links in the other(s) and teacher's browser views).

It should be also noted that the present invention is capable of suggesting but deferring to another user's choices when it comes to the browsing experience. For example, if a first user is viewing a movie on a particular web site with a second user and the first user suggests going back to the beginning of the movie file, the second user is not automatically sent back to the beginning of the movie simply because that is the navigation choice made by the first user. This is because the navigation information sent in the messages are not command messages and do not result in modifying the behavior of the other browser such that the navigation control is forced. In other words, the sent navigation data enables highlighting but not actual direction to the highlighted link. Thus, the instant invention is concerned with sending indications to the other browsers (i.e. flash or highlight the link). This feature is useful in helpdesk settings, where the technician wishes to indicate proper links to follow (e.g. to download a device driver) but does not wish to download the drivers on his or her machine, nor force the person seeking help to download the drivers.

Those of ordinary skill in the art will readily understand that the highlighting of the links indicated via the navigation can take on a variety of forms at least including using visual and audio highlighting. For example, a link could be color coded as to a particular user (e.g. one person could have pink highlighted links and another person could have blue highlighted links). In another embodiment, the link could, instead employing color coding around the link that was being clicked by various users, have an instant messenger (IM) or other icon that appears/hovers next to the link the user associated with that icon had clicked on. Additionally, highlighting could include use of a pattern or a picture of essentially anything, enlargement of the fonts of the link, etc. Among the conceivable ways that a link or object could be highlighted are multiple indicators. For example, when the receiving user hovers over (i.e. places the mouse pointer over) the icon mentioned above utilized for highlighting a link, it could play music or sounds that indicates a particular person associated with the icon (i.e. different sounds for different people). To summarize, the highlighting can be tailored to specific situations as necessary. The instant invention will also enable either the sending or the receiving user(s) to select among these various options for highlighting links and other objects.

An embodiment of the present invention may be provided as a computer program product which may include a machine-readable medium having stored thereon instructions which may be used to program a computer (or other electronic devices) to perform a process according to the any of the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, an embodiment of the present invention may also be downloaded as a computer program product, wherein the program may be transferred from a remote computer to a requesting computer by way of data signals embodied in a carrier wave or other propagation medium via a communication link (e.g., a modem or network connection).

Elements of the instant invention may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

In the drawings and specifications there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

Many of the functional units described in this specification have been labeled as modules in order to emphasize their implementation independence. Modules may include hardware circuits such as one or more processors with memory, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

What is claimed is:

1. A system comprising:
   a CPU;
   a system memory in communication with the CPU;
   a display medium; and
   instructions stored in the system memory and executable by the CPU, the
   instructions comprising:
   instructions for joining a device to a collaborative web browsing session; and instructions for providing, upon an object appearing upon the display medium being selected by a user, outgoing object addressing data that identifies a position of the object selected within a document model and enables a rendering of the object to be wherein the visual indication upon the least one other display medium does not appear on the display medium of the user that selected the object;
   distinguished from other objects rendered upon at least one other display medium of at least one other device;
   wherein the outgoing object addressing data includes data to effect a visual indication upon the at least one other display medium that the user selected the object appearing on the display medium; and
   wherein the outgoing object addressing data further comprises an address of the object extended by X, Y object coordinates addressing a position within said object.

2. The system according to claim 1 wherein the outgoing object addressing data comprises a Document Object Model (DOM) address in a tree-like notation for the object.

3. The system according to claim 1 wherein the visual indication comprises visible flashing of the object.

4. The system according to claim 1 wherein the visual indication comprises display of an icon associated with the object.

5. The system according to claim 1 further comprising:
   a reception module that receives incoming object addressing data from the at least one other device.

6. The system according to claim 5 wherein the reception module is adapted to utilize the incoming object addressing data to render an object displayed upon the display medium and indicated as selected by the incoming object addressing data visually distinguishable from other objects rendered upon the display medium.

7. The system according to claim 6 wherein the object displayed upon the display medium and indicated as selected by the incoming object addressing data is rendered visually distinguishable from other objects rendered upon the display medium via visible flashing.

8. A method comprising: joining a device to a collaborative web browsing session; and upon selection of an object rendered upon a display medium of the device, providing outgoing object addressing data that identifies a position of the object selected within a document model and enables a rendering of the object to be distinguished from other objects rendered upon at least one other display medium of at least one other device;
   wherein the outgoing object addressing data includes data to effect a visual indication upon the at least one other display medium that the user selected the object rendered on the display medium; and
   wherein the visual indication upon the least one other display medium does not appear on the display medium of the user selecting the object
   wherein the outgoing object addressing data further comprises an address of the object extended by X, Y object coordinates addressing a position within said object.

9. The method according to claim 8 wherein the outgoing object addressing data comprises a Document Object Model (DOM) address in a tree-like notation for the object.

10. The method according to claim 8 wherein the visual indication comprises visible flashing of the object.

11. The method according to claim 8 wherein the visual indication comprises display of an icon associated with the object.

12. The method according to claim 8 further comprising:
    receiving incoming object addressing data from the at least one other device.

13. The method according to claim 12 wherein the receiving step further comprises utilizing the incoming object addressing data to render an object displayed upon the display medium and indicated as selected by the incoming object addressing data visually distinguishable from other objects rendered upon the display medium.

14. The method according to claim 13 wherein the receiving step further comprises rendering, via visible flashing, the object displayed upon the display medium and indicated as selected by the incoming object addressing data visually distinguishable from other objects rendered upon the display medium.

15. A non-transitory program storage device readable by machine, tangibly embodying a program of instructions executable by the machine to perform a acts comprising:

joining a device to a collaborative web browsing session; and upon selection of an object rendered upon a display medium of the device, providing outgoing object addressing data that identifies a position of the object selected within a document model and enables a rendering of the object to be distinguished from other objects rendered upon at least one other display medium of at least one other device;

wherein the outgoing object addressing data includes data to effect a visual indication upon the at least one other display medium that the user selected the object rendered on the display medium and wherein the visual indication upon the least one other display medium does not appear on the display medium of the user selecting the object wherein the outgoing object addressing data further comprises an address of the object extended by X, Y object coordinates addressing a position within said object.

\* \* \* \* \*